(12) United States Patent
Thantharate et al.

(10) Patent No.: US 11,805,480 B2
(45) Date of Patent: *Oct. 31, 2023

(54) WIRELESS NETWORK SLICE SELECTION IN WIRELESS USER EQUIPMENT (UE)

(71) Applicant: T-Mobile Innovations LLC, Overland Park, KS (US)

(72) Inventors: Anurag Thantharate, Kansas City, MO (US); Hannah Jo Sifuentes, Lee's Summit, MO (US); Sougata Saha, Olathe, KS (US); Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,188

(22) Filed: Jan. 19, 2022

(65) Prior Publication Data
US 2022/0141765 A1    May 5, 2022

Related U.S. Application Data

(63) Continuation of application No. 16/901,271, filed on Jun. 15, 2020, now Pat. No. 11,277,790.

(51) Int. Cl.
*H04W 48/18* (2009.01)
*H04W 4/70* (2018.01)
(Continued)

(52) U.S. Cl.
CPC ........ *H04W 48/18* (2013.01); *G06F 9/45558* (2013.01); *H04W 4/70* (2018.02);
(Continued)

(58) Field of Classification Search
CPC ......... H04W 48/18; H04W 4/70; H04W 8/24; H04W 28/0268; H04W 48/16; H04W 72/0453
See application file for complete search history.

(56) References Cited

U.S. PATENT DOCUMENTS 9,961,713 B2    5/2018 Salkintzis
10,268,474 B2    4/2019 Stammers et al.
(Continued)

FOREIGN PATENT DOCUMENTS

EP    3544337 A1    9/2019
WO    2017143047 A1    8/2017
(Continued)

*Primary Examiner* — Diane D Mizrahi (57) ABSTRACT

A wireless access node wirelessly broadcasts System Information Blocks (SIBs) that indicate individual slice characteristics for wireless network slices. A wireless UE wirelessly receives the SIBs, selects one of the slices based on user requirements for a user application and the individual slice characteristics for the slices, and transfers UE capability information that indicates the selected slice to the wireless access node. The wireless access node transfers the UE capability information to an Access and Mobility Management Function (AMF). The AMF authorizes the wireless UE for the selected slice and selects Quality-of-Service (QoS) parameters for the wireless UE that correspond to the individual slice characteristics for the selected slice. The AMF transfers signaling to the wireless access node to serve the wireless UE per the selected QoS parameters. The wireless access node wirelessly exchanges user data with the wireless UE per the selected QoS parameters.

20 Claims, 8 Drawing Sheets

(51) Int. Cl.
    *G06F 9/455*       (2018.01)
    *H04W 8/24*       (2009.01)
    *H04W 28/02*      (2009.01)
    *H04W 48/16*      (2009.01)
    *H04W 72/0453*    (2023.01)

(52) U.S. Cl.
    CPC ......... *H04W 8/24* (2013.01); *H04W 28/0268* (2013.01); *H04W 48/16* (2013.01); *H04W 72/0453* (2013.01); *G06F 2009/45595* (2013.01)

(56) References Cited

U.S. PATENT DOCUMENTS

| | | |
|---|---|---|
| 11,277,790 B2 * | 3/2022 | Thantharate ...... H04W 72/0453 |
| 2017/0367036 A1 | 12/2017 | Chen et al. |
| 2018/0270744 A1 | 9/2018 | Griot et al. |
| 2019/0053104 A1 | 2/2019 | Qiao et al. |
| 2019/0053147 A1 | 2/2019 | Qiao et al. |
| 2019/0124508 A1 | 4/2019 | Watfa et al. |
| 2019/0223093 A1 | 7/2019 | Watfa et al. |
| 2019/0289534 A1 | 9/2019 | Ryoo et al. |
| 2019/0364492 A1 | 11/2019 | Azizi et al. |
| 2020/0015158 A1 | 1/2020 | So |
| 2020/0059856 A1 | 2/2020 | Cui et al. |
| 2020/0120721 A1 | 4/2020 | Lau et al. |

FOREIGN PATENT DOCUMENTS

| | | |
|---|---|---|
| WO | 2017218849 A1 | 12/2017 |
| WO | 2018036349 A1 | 3/2018 |
| WO | 2018120909 A1 | 7/2018 |
| WO | 2020091636 A1 | 5/2020 |

* cited by examiner

FIGURE 8

WIRELESS NETWORK SLICE SELECTION IN WIRELESS USER EQUIPMENT (UE)

RELATED CASES

This United States Patent Application is a continuation of U.S. patent application Ser. No. 16/901,271 was filed on Jun. 15, 2020 and is entitled "WIRELESS NETWORK SLICE SELECTION IN WIRELESS USER EQUIPMENT (UE)." U.S. patent application Ser. No. 16/901,271 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. For example, a human may operate a phone to participate in a mobile video-conference. In another example, an unmanned aerial vehicle may wirelessly receive navigation instructions while in-flight. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Low-Power Wide Area Network (LP-WAN), and Millimeter Wave (MMW).

The wireless communication networks are implementing network virtualization by deploying computer equipment with virtualization software that supports virtual network elements over shared computer equipment instead of having dedicated software/hardware network element combinations. Along with load-balancing and other benefits, the virtualization enables the rapid deployment of virtual networks that are comprised of virtual network elements. The virtual networks feature different characteristics like throughput, latency, and cost. The wireless communication networks select these network slices for the wireless user devices based on factors like user service plan and device ID. Although the wireless user devices may request particular network slices from the wireless communication networks, the wireless user devices may not always use the best network slices for their own individual requirements. Unfortunately, the wireless user devices do not efficiently and effectively control the wireless network slices that they use to serve their own specific requirements.

Technical Overview

A wireless access node wirelessly broadcasts System Information Blocks (SIBs) that indicate individual slice characteristics for wireless network slices. A wireless UE wirelessly receives the SIBs, selects one of the slices based on user requirements for a user application and the individual slice characteristics for the slices, and transfers UE capability information that indicates the selected slice to the wireless access node. The wireless access node transfers the UE capability information to an Access and Mobility Management Function (AMF). The AMF authorizes the wireless UE for the selected slice and selects Quality-of-Service (QoS) parameters for the wireless UE that correspond to the individual slice characteristics for the selected slice. The AMF transfers signaling to the wireless access node to serve the wireless UE per the selected QoS parameters. The wireless access node wirelessly exchanges user data with the wireless UE per the selected QoS parameters.

DETAILED DESCRIPTION

Figure 1:
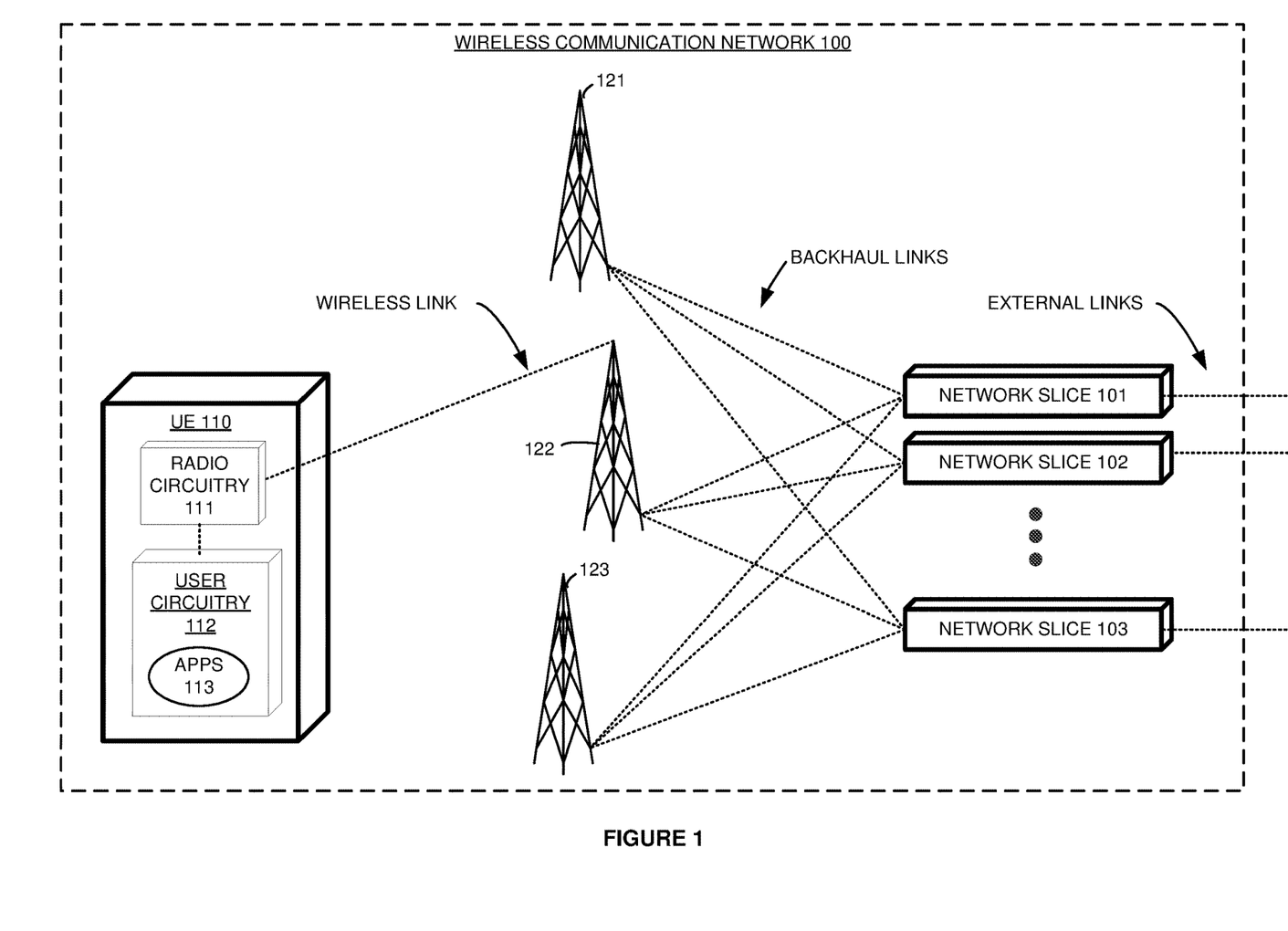
FIG. 1 illustrates a wireless communication network that comprises a wireless User Equipment (UE) that selects wireless network slices for its user applications.

FIG. 1 illustrates wireless communication network 100 that comprises wireless User Equipment (UE) 110 that selects one or more wireless network slices 101-103 for its user applications (APPS) 113. Wireless communication network 100 comprises wireless UE 110, wireless access nodes 121-123, and wireless network slices 101-103. Wireless network slices 101-103 support wireless data services like content-streaming, machine-control, vehicle-control, media-conferencing, interactive-gaming, social-networking, augmented-reality, and/or some other wireless networking product.

Various examples of network operation and configuration are described herein. In some examples, wireless access node 122 wirelessly transmits network information to UE 110 that indicates wireless network slices 101-103 and their individual slice characteristics. In UE 110, radio circuitry 111 wirelessly receives the network information from wireless access node 122. User circuitry 112 executes user applications 113 that have user requirements. User circuitry 112 compares the user requirements to the slice characteristics for correspondence to select one or more corresponding wireless network slices 101-103. For example, a drone UE that executes a flight-control user application which requires ultra-low latency might select a drone communication slice that has appropriate ultra-low latency. User circuitry 112 generates network signaling that indicates the selected wireless network slices 101-103, and radio circuitry 111 wirelessly transfers the network signaling. User circuitry 112 wirelessly exchanges user data for user applications 113 with radio circuitry 111, and radio circuitry 111 wirelessly exchanges the user data with wireless access node 122. The selected wireless network slices 101-103 handle the user data for UE 110. Advantageously, the wireless UE 110 efficiently and effectively controls wireless network slices 101-103 to serve its own specific user requirements.

In some examples, the network slice selection is specific to the frequency band. Thus, UE 110 may select different wireless slices when using different frequency bands—even though user applications 113, slices 101-103, and their slice characteristics remain the same. For example, UE 110 may attach to wireless access node 122 over a frequency band configured with smaller bandwidth allocations per UE, so slice throughput directs the selection of slice 101 which has better average slice throughput than slices 102-103. UE 110 may then attach to wireless access node 123 over a different frequency band which has much larger bandwidth allocations per UE, so slice throughput become less important than other factors like cost. Low slice cost may now direct the selection of slice 103 which has lower cost (and bigger bandwidth allocations) than slices 102-103.

Wireless UE 110 might be a phone, computer, robot, vehicle, or some other data appliance with wireless communication circuitry. UE 110 comprises radio circuitry 111 and user circuitry 112. Radio circuitry 111 comprises antennas, amplifiers, filters, modulation, analog/digital interfaces, microprocessors, software, memories, transceivers, bus circuitry, and the like. User circuitry 112 comprises microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications 113, and network applications.

The microprocessors retrieve the software from the memories and execute the software to drive the operation of wireless UE 110 as described herein. UE 110 may use Fifth Generation New Radio (5GNR), Long Term Evolution (LTE), Evolved Universal Terrestrial Radio Access Network Dual Connectivity (EN-DC), Institute of Electrical and Electronic Engineers (IEEE) 802.11 (WIFI), Low-Power Wide Area Network (LP-WAN), Millimeter Wave (MMW), and/or some other wireless network protocol. UE 110 generates and transmits wireless network signaling that indicates its selected network slices. The network signaling may comprise a UE capability message. User applications 113 may have user requirements like quality-of-service parameters, massive Machine Type Communications (eMTC) information, Ultra Reliable Low Latency Communications (URLLC) information, and enhanced Mobile Broadband (eMBB) information, and/or some other requirement data.

Wireless access nodes 121-123 are depicted by towers, but access nodes 121-123 may use other mounting structures or no mounting structure at all. Wireless access nodes 121-123 may be 5GNR gNodeBs, LTE eNodeBs, EN-DC nodes, WIFI hotspots, LP-WAN access points, MMW radio hubs, and/or some other wireless network apparatus. Wireless access nodes 121-123 wirelessly transfer network information that indicates wireless network slices 101-103 and their individual slice characteristics. The wireless network information may comprise a Master Information Block (MIB), System Information Block (SIB), and/or some other network signaling that indicates wireless network slices 101-103 and their slice characteristics.

Wireless access nodes 121-123 comprise radio circuitry and baseband circuitry. The radio circuitry comprises antennas, amplifiers, filters, modulation, analog/digital interfaces, microprocessors, software, memories, transceivers, bus circuitry, and the like. The baseband circuitry comprises microprocessors, memories, software, transceivers, bus circuitry, and the like. The microprocessors comprise DSP, CPU, GPU, ASIC, and/or the like. The memories comprise RAM, flash circuitry, disk drives, and/or the like. The memories store software like operating systems and network applications. The microprocessors retrieve the software from the memories and execute the software to drive the operation of wireless access nodes 121-123 as described herein.

Wireless network slices 101-103 comprise one or more network elements like User Plane Functions (UPFs), Application Functions (AFs), and/or some other 5G core functions. In some examples, wireless network slices 101-103 comprise Radio Access Network (RAN) network elements like gNodeBs, relays, Central Units (CUs), Distributed Units (DUs), and/or some other 5G RAN elements. In some examples, wireless network slices 101-103 comprise one or more Virtual Network Function Infrastructures (NFVIs) that execute 5GC Virtual Network Functions (VNFs) and/or 5GNR RAN VNFs. Wireless network slices 101-103 comprise microprocessors, memories, software, transceivers, bus circuitry, and the like. The microprocessors comprise DSP, CPU, GPU, ASIC, and/or the like. The memories comprise RAM, flash circuitry, disk drives, and/or the like. The memories store software like operating systems and network applications. The microprocessors retrieve the software from the memories and execute the software to drive the operation of wireless network slices 101-103 as described herein.

UE 110 may be coupled to any of wireless access nodes 121-123 over wireless links and is wirelessly coupled to access node 122 in this example. The wireless links use electromagnetic frequencies in the low-band, mid-band, high-band, or some other portion of the electromagnetic spectrum. These wireless links use protocols like 5GNR, LTE, WIFI, LP-WAN, MMW and/or some other wireless communication format. Wireless access nodes 121-123 are coupled to wireless network slices 101-103 over backhaul links. Wireless network slices 101-103 are coupled to external systems like the internet over external links. The backhaul links and the external links use metal, glass, air, or some other media. The backhaul links and the external links use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols. The backhaul links and the external links may comprise intermediate network elements like relays, routers, and controllers.

Figure 2:
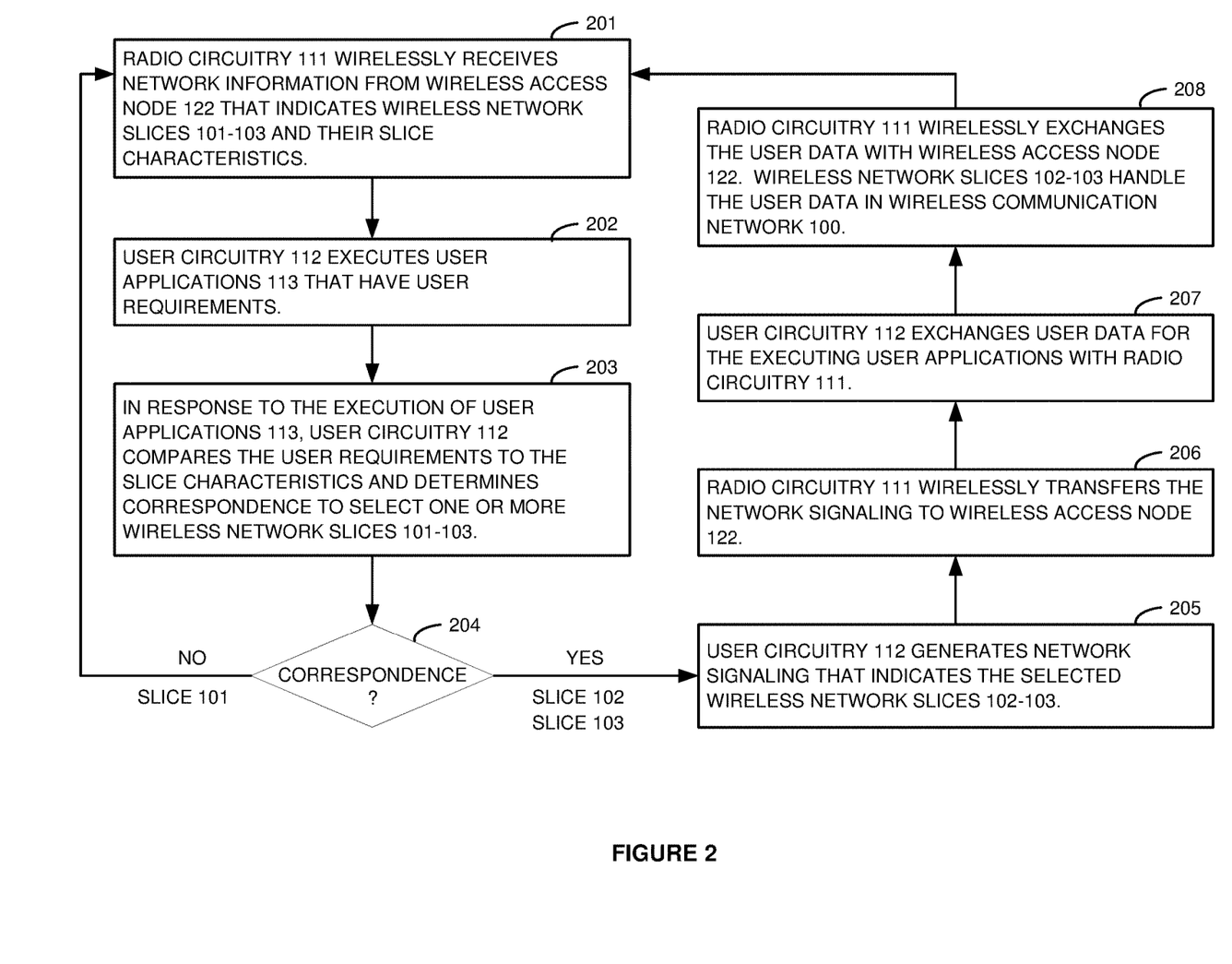
FIG. 2 illustrates an exemplary operation of the wireless UE to select wireless network slices for its user applications.

FIG. 2 illustrates an exemplary operation of wireless UE 110 to select wireless network slices 101-103 for its user applications 113. Radio circuitry 111 wirelessly receives network information from wireless access node 122 that indicates wireless network slices 101-103 and their individual slice characteristics (201). User circuitry 112 executes user applications 113 that have user requirements (202). In response to executing the user applications, user circuitry 112 compares the user requirements to the slice characteristics to select wireless network slices based on their correspondence (203). In this example, the slice requirements and the user requirements properly correspond for network slices 102-103 (204). The slice requirements and the user requirements do not correspond for network slice 102 (204). User circuitry 112 selects network slices 102-103 and generates network signaling that indicates selected wireless network slices 102-103 (205). Radio circuitry 111 wirelessly transfers the network signaling to wireless access node 122 (206). User circuitry 112 wirelessly exchanges user data for executing user applications 113 with radio circuitry 111 (207). Radio circuitry 111 wirelessly exchanges the user data with wireless access node 122, and wireless network slices 102-103 handle the user data (208). The operation repeats (201).

Figure 3:
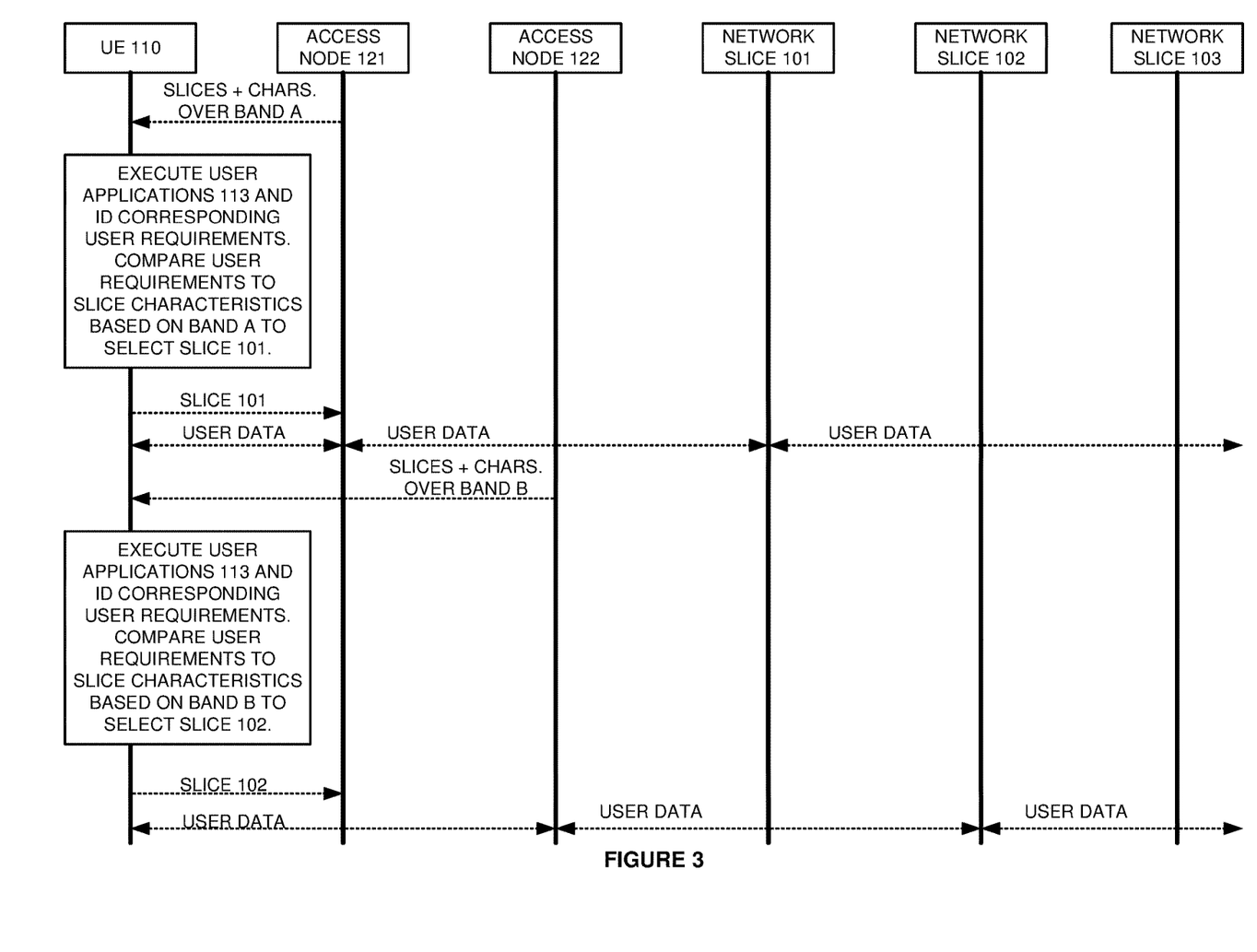
FIG. 3 illustrates another exemplary operation of the wireless UE to select wireless network slices for its user applications.

FIG. 3 illustrates another exemplary operation of wireless UE 110 to select wireless network slices 101-103 for its user applications 113. Over a representative frequency band "A", wireless access node 121 transmits network information that indicates wireless network slices 101-103 and their individual slice characteristics (CHARS). UE 110 wirelessly receives the network information from wireless access node 121 over band A. UE 110 executes user applications 113 which have user requirements. UE 110 identifies these user requirements. UE 110 compares the user requirements to the slice characteristics for correspondence based on band A. In this example, UE 110 selects wireless network slice 101 based on the correspondence of slice 101 characteristics with the user requirements when using band A. Thus, UE 110 analyzes a combination of factors for user applications, network slices, and frequency bands to select network slices. UE 110 generates and transfers network signaling to wireless access node 121 over band A. The network signaling indicates selected wireless network slice 101. In response to the network signaling, UE 110 and wireless access node 121 wirelessly exchange user data for user applications 113. Wireless access node 121 and wireless network slice 101 exchange the user data. Wireless network slice 101 and external systems exchange the user data.

Over a different frequency band "B", wireless access node 122 transmits network information that indicates wireless network slices 101-103 and their individual slice characteristics. UE 110 wirelessly receives the network information from wireless access node 122 over band B. UE 110 executes user applications 113, and UE 110 identifies their user requirements. UE 110 compares the user requirements to the slice characteristics for correspondence based on band B. In this example, UE 110 selects wireless network slice 102 based on the correspondence of slice 102 characteristics with the user requirements when using band B. Again, UE 110 analyzes factors for the applications, slices, and bands to select the slices. UE 110 generates and transfers network signaling to wireless access node 121 over band B. The network signaling indicates selected wireless network slice 102. In response to the network signaling, UE 110 and wireless access node 122 wirelessly exchange user data for user applications 113. Wireless access node 121 and wireless network slice 102 exchange the user data. Wireless network slice 102 and external systems exchange the user data.

Figure 4:
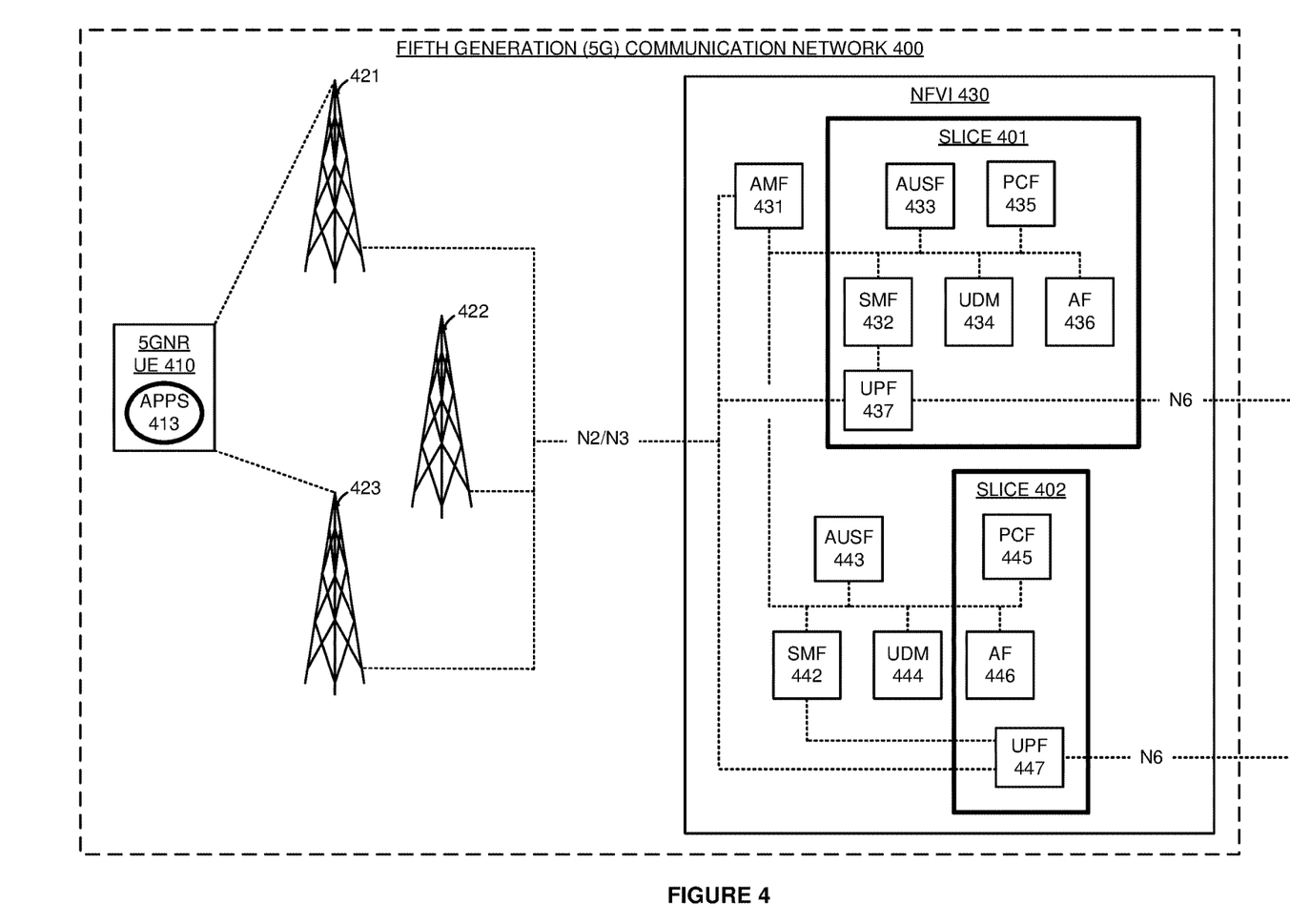
FIG. 4 illustrates a Fifth Generation (5G) network that comprises a 5G New Radio (5GNR) UE that selects wireless network slices for its user applications.

FIG. 4 illustrates Fifth Generation (5G) network 400 that comprises Fifth Generation New Radio (5GNR) UE 411 that selects wireless network slices 401-402 for user applications 413. 5G communication network 400 is an example of wireless communication network 100, although network 100 may differ. 5G communication network 400 comprises 5GNR UE 410, 5GNR gNodeBs 421-423, and Network Function Virtualization Infrastructure (NFVI) 430. NFVI 430 comprises network slices 401-402, Access and Mobility Management Function (AMF) 431, Session Management Function (SMF) 442, Authentication and Security Function (AUSF) 443, and Unified Data Manager (UDM) 444. Network slice 401 comprises SMF 432, AUSF 433, UDM 434, Policy Control Function (435), Application Function (AF) 436, and User Plane Function (UPF) 437. Network slice 402 comprises PCF 445, AF 446, and UPF 447. Network slices 401-402 are representative and slices 401-402 could use other combinations of network elements and VNFs. The number of network slices depicted on FIG. 4 is restricted for clarity.

5GNR UE 410 is wirelessly linked to 5GNR gNodeB 421 at first, and then, and then, 5GNR UE 410 wirelessly links to 5GNR gNodeB 423. 5GNR gNodeBs 421-423 are linked to AMF 431, UPF 437, and UPF 447 in NFVI 430. UPFs 437 and 447 are linked to external systems like the internet and enterprise networks. 5GNR gNodeBs 421-423 wirelessly broadcast Master Information Blocks (MIBs) and System Information Blocks (SIBs) that indicate wireless network slices 401-402 and their individual slice characteristics like data rate, data latency, error rate band, owner, cost, network ID, and/or some other slice information. 5GNR UE 410 wirelessly receives the MIB/SIB broadcasts from 5GNR gNodeB 421 and then 423 that indicate wireless network slices 401-402 and their slice characteristics.

UE 410 executes user applications 413 like video-streaming, vehicle-control, augmented-reality, or some other user software. User applications 413 have user requirements like data rate, latency, error rate, owner, cost, network ID, and/or some other user requirements. UE 410 compares the user requirements to the slice characteristics for correspondence to select one or more corresponding wireless network slices 401-402.

In some examples, 5GNR UE 410 wirelessly attaches to 5GNR gNodeB 421 and executes user applications 413. UE 410 could select network slice 401 to serve user applications 413 based on a slice owner name and a slice network ID that is broadcast in a SIB from gNodeB 421. UE 410 generates a UE capability message that indicates selected wireless network slice 401. UE 410 wirelessly transfers the UE capability messaging to AMF 431 over 5GNR gNodeB 421. In response to the UE capability message, AMF 431 initially attempts to use selected network slice 401. AMF 431 interacts with AUSF 433 which interacts with UDM 434 to authenticate and authorize UE 410 for network slice 401. AMF 431 interacts with UDM 434 to obtain UE data including a list of authorized network slices for UE 410. AMF 431 authorizes network slice 401 in response to the request by UE 410 and slice 401 being on the authorization list from AUSF 433. AMF 431 may use a Network Slice Selection Function (NSSF) to assist with slice authorization. AMF 431 interacts with PCF 435 to select Quality-of-Service (QoS) parameters for selected network slice 401. The QoS parameters should correspond to the slice characterization in the broadcast SIB and to the user requirements in UE 410. AMF 433 directs SMF 432 to instantiate selected network slice 401 per the QoS parameters. SMF 432 interacts with UDM 434 to select UPF 437 based on selected slice 401. SMF 432 configures UPF 437 to serve UE 410 and signals AMF 431 that UPF 437 is configured for UE 410. AMF 431 signals 5GNR gNodeB 421 to serve UE 421 over slice 401 per the QoS parameters. 5GNR gNodeB 421 signals UE 410 with network addresses and QoS parameters for selected network slice 401. 5GNR UE 410 and 5GNR gNodeB 421 wirelessly exchanges user data responsive to the signaling. 5GNR gNodeB 421 and UPF 437 exchange the user data responsive to the signaling. UPF 437 exchanges the user data with an external systems responsive to the signaling.

In another example, UE 410 detaches from 5GNR gNodeB 421 and attaches to 5GNR gNodeB 423 over frequency band B. UE 410 now selects network slice 402 to serve user applications 413 based on the slice owner name, slice network ID, and the different frequency band that is used by gNodeB 423. Thus, 5GNR UE 410 selects a different slice based on the different frequency band—typically based on factors like channel size, radio technology, band cost, and band power. UE 410 generates a UE capability message that indicates selected wireless network slice 402. UE 410 wirelessly transfers the UE capability messaging to AMF 431 over 5GNR gNodeB 423. In response to the UE capability message, AMF 431 attempts to use requested network slice 402. AMF 431 interacts with AUSF 443 which interacts with UDM 444 to authenticate and authorize UE 410 for network slice 402. AMF 431 interacts with UDM 444 to obtain UE data including a list of authorized network slices for UE 410. AMF 431 authorizes network slice 402 responsive to the request by UE 410 and slice 402 being on the authorization list from AUSF 443. AMF 431 interacts with PCF 445 to select QoS parameters for selected network slice 402. The QoS parameters should correspond to the slice characterization in the broadcast SIB and to the user requirements in UE 410. AMF 431 directs SMF 442 to instantiate selected network slice 402 per the QoS parameters. SMF 442 interacts with UDM 444 to select UPF 447 based on selected slice 402. SMF 442 configures UPF 447 to serve UE 410 and signals AMF 431 that UPF 447 is configured to serve UE 410. AMF signals 5GNR gNodeB 423 to serve UE 410 over slice 402 per the QoS parameters. 5GNR gNodeB 423 signals UE 410 with network addresses and QoS parameters for selected network slice 402. 5GNR UE 410 and 5GNR gNodeB 423 wirelessly exchange user data responsive to the signaling. 5GNR gNodeB 423 and UPF 447 exchange the user data responsive to the signaling. UPF 447 exchanges the user data with an external systems responsive to the signaling.

Figure 5:
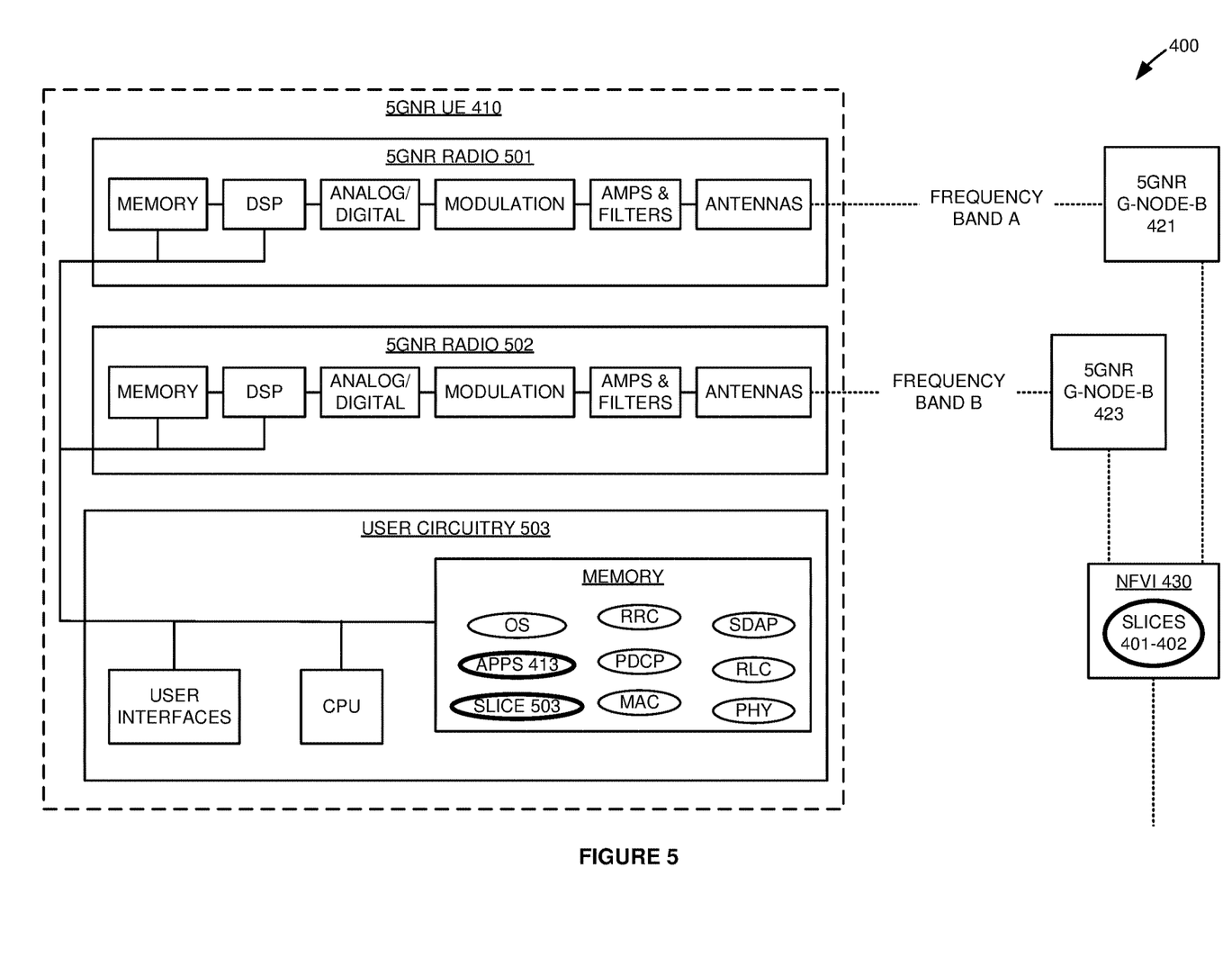
FIG. 5 illustrates the 5GNR UE that selects wireless network slices for its user applications.

FIG. 5 illustrates 5GNR UE 410 that selects wireless network slices 401-402 for user applications 413. 5GNR UE 410 is an example of UE 110, although UE 110 may differ. 5GNR UE 410 comprises 5GNR radios 501-502 and user circuitry 503 that are coupled over bus circuitry. 5GNR radios 501-502 comprise antennas, amplifiers, filters, modulation, analog-to-digital interfaces, DSP, and memory that are coupled over bus circuitry. User circuitry 503 comprises user interfaces, CPU, and memory that are coupled over bus circuitry. The antennas in 5GNR radios 501-502 are wirelessly coupled to 5GNR gNodeB 421 over respective frequency bands A and B. The user interfaces in user circuitry 503 comprise graphic displays, machine controllers, sensors, cameras, transceivers, and/or some other user components. The memory in user circuitry 503 stores an operating system (OS), user applications 413, slice controller (SLICE) 503, and network applications (PHY, MAC, RLC, PDCP, SDAP, and RRC). The CPU in user circuitry 503 executes the operating system and the user applications to generate and consume user data. The CPU in user circuitry 503 executes the operating system, slice controller 503, and the network applications to wirelessly exchange corresponding signaling and data with 5GNR gNodeBs 421 and 423 over 5GNR radios 501-502 and frequency bands A-B.

In 5GNR radios 501-502, the antennas receive wireless 5GNR signals from 5GNR gNodeBs 421 and 423 over the bands A and B. The wireless 5GNR signals transport DL 5GNR signaling and DL 5GNR data. The DL 5GNR signaling includes broadcast Master Information Blocks (MIBs) and System Information Blocks (SIBs) that transport slice IDs for slices 401-402 and their slice characteristics. The antennas transfer corresponding electrical DL signals through duplexers to the amplifiers. The amplifiers boost the received DL signals for filters which attenuate unwanted energy. In modulation, demodulators down-convert the DL signals from their frequency bands A and B. The analog/digital interfaces convert the analog DL signals into digital DL signals for the DSP. The DSP recovers DL 5GNR symbols from the DL digital signals and transfers the DL 5GNR symbols to user circuitry 503. The CPU in user circuitry 503 executes the network applications to process the DL 5GNR symbols and recover the DL 5GNR signaling and the DL 5GNR data. The network applications transfer the slice IDs and their slice characteristics from the MIBs/SIBs to slice controller 503. The network applications transfer corresponding DL user data to user applications 413 over the operating system.

The network applications process the DL 5GNR signaling and operating system signaling to generate UL 5GNR signaling. The UL 5GNR signaling indicates selected slice IDs in UE capability messages. User applications 413 transfer UL user data to the network applications over the operating system. The network applications process the UL 5GNR signaling and the UL 5GNR data to generate corresponding UL 5GNR symbols. The network applications transfer the UL 5GNR symbols to the DSP in radios 501-502. In radios 501-502, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their frequency bands A and B. The amplifiers boost the modulated UL signals for the filters which attenuate unwanted out-of-band energy. The filters transfer the filtered UL signals through duplexers to the antennas. The electrical UL signals drive the antennas to emit corresponding wireless signals that transport the UL 5GNR signaling and corresponding UL 5GNR data to 5GNR gNodeBs 421 and 423 over bands A and B.

RRC functions comprise authentication, security, handover control, status reporting, Quality-of-Service (QoS), network broadcasts and pages, and network selection. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

User circuitry 503 executes user applications 413 like video-streaming, vehicle-control, augmented-reality, or some other user software. User applications 413 have user requirements like data rate, latency, error rate, owner, cost, network ID, and/or some other user requirements. Slice controller 503 identifies executing user applications 413 and their individual user requirements. Slice controller 413 compares the user requirements for user applications 413 to the slice characteristics for slices 401-402 to identify correspondence and select corresponding wireless network slices 401-402. Slice controller 503 typically hosts a data structure that is entered with codes for the user requirements, the slice characteristics, and the frequency bands to yield selected network slices. Slice 401 is selected based on the user requirements, the slice characteristics, and the frequency bands in this example.

Advantageously, slice controller 503 factors in the frequency band in addition to slice characteristics and user requirements to effectively distinguish the slices when based on the different frequency bands. For example, frequency band A may have a channel size or power requirement that alters the desirability of slice characteristics like data throughput or signal range. Thus, slice controller 503 may select different slices based on different frequency bands and their inherent characteristics—even when the user requirements and the slice characteristics remain the same. In this example, slice controller 503 signals the ID for selected network slice 401 to the RRC in user circuitry 503. The RRC signals the ID for selected network slice 401 to 5GNR gNodeB 421 or 423 over radio 501 or 502. The SDAP in user circuitry 503 and 5GNR gNodeB 421 or 423 wirelessly exchange user data responsive to the signaling. 5GNR gNodeB 421 or 423 and selected network slice 401 exchange the user internet data responsive to the signaling.

Figure 6:
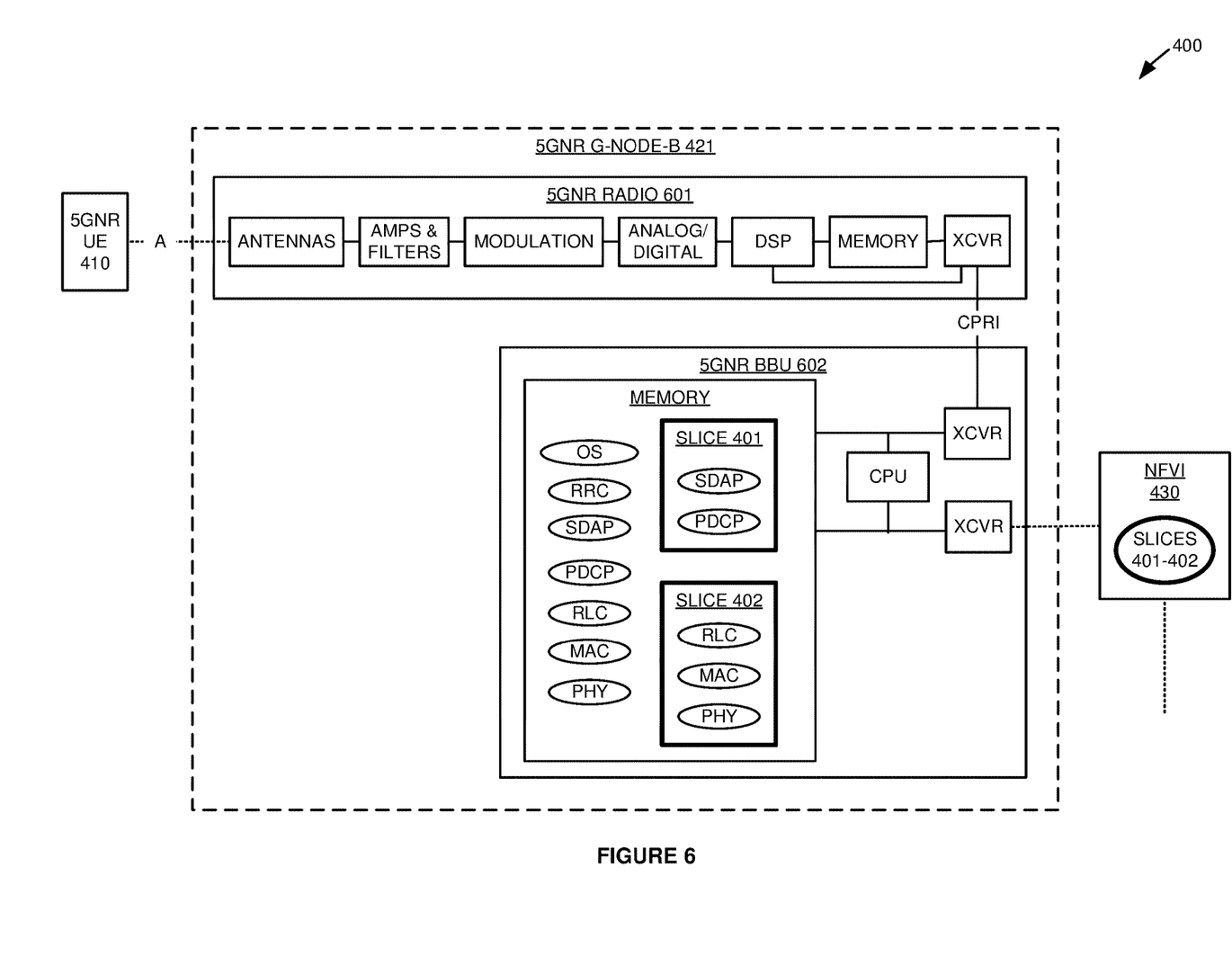
FIG. 6 illustrates a 5GNR gNodeB that wirelessly serves the 5GNR UE over wireless network slices that were selected by 5GNR UE for its wireless for user applications.

FIG. 6 illustrates 5GNR gNodeB 421 that wirelessly serves 5GNR UE 410 over wireless network slices 401-402 that were selected by 5GNR UE 410 for user applications 413. 5GNR gNodeB 421 comprises an example of gNodeBs 422-423 and wireless access nodes 121-123 although nodes 422-423 and 121-123 may differ. Network slices 401-402 are extended to 5GNR gNodeB 421 in this example. 5GNR gNodeB 421 comprises 5GNR radio 601 and 5GNR Baseband Unit (BBU) 602. 5GNR radio 601 comprises antennas, amplifiers, filters, modulation, analog-to-digital interfaces, DSP, memory, and transceivers that are coupled over bus circuitry. BBU 602 comprises memory, CPU, and transceivers that are coupled over bus circuitry.

The memory in BBU 602 stores operating systems, network applications (PHY, MAC, RLC, PDCP, RRC, and SDAP). The CPU in BBU 506 executes the operating systems, PHYs, MACs, RLCs, PDCPs, SDAPs, and RRCs to exchange network signaling with 5GNR UE 410 and NFVI 430 and to exchange user data between 5GNR UE 410 and NFVI 430. 5GNR UE 410 is wirelessly coupled to the antennas in 5GNR radio 601 over the frequency band A. The transceiver in 5GNR radio 601 is coupled to a transceiver in 5GNR BBU 602 over Common Public Radio Interface (CPRI). A transceiver in 5GNR BBU 602 is coupled to NFVI 430 over backhaul links.

In 5GNR radio 601, the antennas receive wireless 5GNR signals from 5GNR UE 410 over frequency band A that transport UL 5GNR signaling and UL 5GNR data. The UL 5GNR signaling indicates selected network slices. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and Downlink (DL) N2 signaling from NFVI 430 to generate new UL N2 signaling and new DL 5GNR signaling. The 5GNR RRC transfers the new UL N2 signaling to NFVI 430. The new UL N2 signaling indicates the selected network slices. The 5GNR SDAP transfers the UL 5GNR data to NFVI 430 over the backhaul links.

In 5GNR BBU 602, the 5GNR RRC receives the DL N2 signaling from NFVI 430. The 5GNR SDAP receives DL 5GNR data from NFVI 430. The DL N2 signaling indicates slice authorizations, QoS, and the like. The 5GNR network applications process the new DL 5GNR signaling and the DL 5GNR data to generate corresponding DL 5GNR symbols that carry the DL 5GNR signaling and DL 5GNR data. The new DL 5GNR signaling includes the MIBs and SIBs that indicate network slices 401-402 and their slice characteristics. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to frequency band A. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 410 over frequency band A.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The RRC in 5GNR BBU 602 broadcast MIBs and SIBs over radio 601 and frequency band A that indicate network slices 401-402 and their slice characteristics. The RRC in 5GNR BBU 602 receives selected network slice IDs in UE capability messages from 5GNR UE 410 over radio 601 and frequency band A. 5GNR gNodeB 421 transfers the UE capability messages to NFVI 430.

In this example, network slices 401-402 extend to 5GNR BBU 602. Network slice 401 uses a standard OS, RRC, RLC, MAC, and PHY in BBU 602, but slice 401 uses a custom SDAP and PDCP. Network slice 402 uses the standard OS, RRC, SDAP, and PDCP, but uses a custom RLC, MAC, and PHY. NFVI 430 signals 5GNR gNodeB 421 to serve UE 411 per over selected slices 401-402 per the requisite QoS parameters and network addresses. Network slice 401 is selected in this example, and 5GNR gNodeB 421 signals UE 410 over radio 601 with network addresses and QoS parameters for selected network slice 401. 5GNR UE 410 and 5GNR gNodeB 421 wirelessly exchange user data responsive to the signaling. 5GNR gNodeB 421 and NFVI 430 exchange the user data responsive to the signaling.

5GNR gNodeB 421 uses the custom SDAP and PDCP for selected slice 401 to serve 5GNR UE 410. Network slice 402 may be selected in another example, and 5GNR gNodeB 421 would signal UE 410 over radio 601 with network addresses and QoS parameters for selected network slice 402. 5GNR gNodeB 421 then uses the custom RLC, MAC, and PHY for selected slice 402 to serve 5GNR UE 410.

Figure 7:
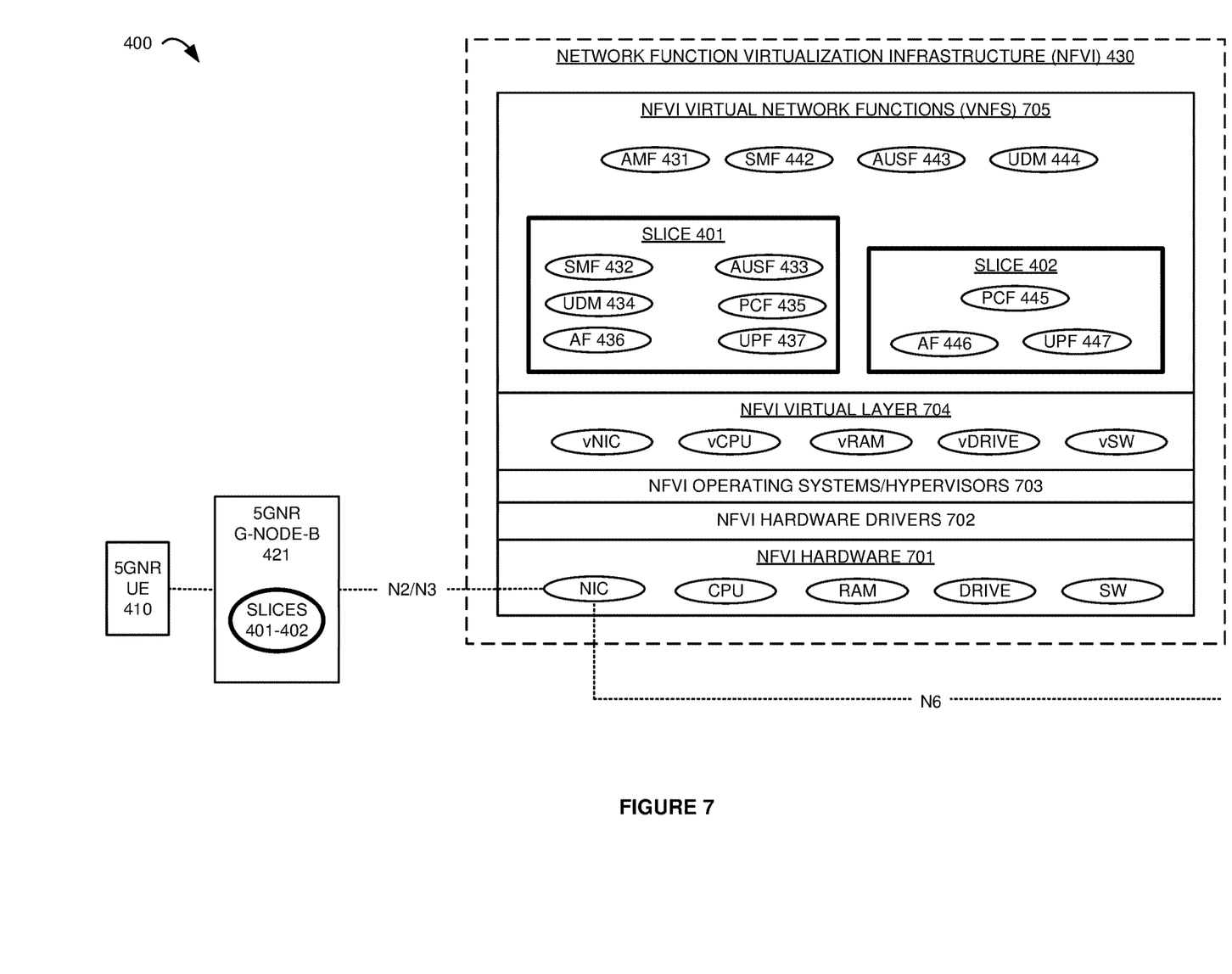
FIG. 7 illustrates a Network Function Virtualization Infrastructure (NFVI) that serves the 5GNR UE over wireless network slices that were selected by the 5GNR UE for its user applications.

FIG. 7 illustrates Network Function Virtualization Infrastructure (NFVI) 430 that serves 5GNR UE 410 over the wireless network slices 401-402 that were selected by 5GNR UE 410 for user applications 413. NFVI 430 is an example of network slices 101-103 although slices 101-103 may differ. NFVI 430 comprises NFVI hardware 701, NFVI hardware drivers 702, NFVI operating systems and hypervisors 703, NFVI virtual layer 704, and NFVI Virtual Network Functions (VNFs) 705. NFVI hardware 701 comprises Network Interface Cards (NIC), CPU, RAM, flash/disk drives, and data switches (SWS). NFVI virtual layer 704 comprises virtual NICs (vNIC), virtual CPUs (vCPU), virtual RAM (vRAM), virtual Drives (vDRIVE), and virtual Switches (vSW). The NIC are coupled to 5GNR gNodeBs 421-423 over backhaul links. The NIC are coupled to external systems over N6 data links. NFVI VNFs 705 comprise AMF 431, SMF, 432, AUSF 433, UDM 434, PCF 435, AF 436, UPF 437, SMF 442, AUSF 443, UDM 444, PCF 445, AF 446, and UPF 447. Network slice 401 comprises SMF, 432, AUSF 433, UDM 434, PCF 435, AF 436, UPF 437. Network slice 402 comprises PCF 445, AF 446, and UPF 447. NFVI hardware 701 executes NFVI hardware drivers 702, NFVI operating systems and hypervisors 703, NFVI virtual layer 704, and NFVI VNFs 705 to serve 5GNR UE 410 over network slices 401-402.

AMF 431 receives UE capability messaging from UE 410 over 5GNR gNodeB 421. In this example, the UE capability messaging indicates selected network slice 401. In response to the UE capability messaging, AMF 431 attempts to use selected network slice 401. AMF 431 interacts with AUSF 433 which interacts with UDM 434 to authenticate and authorize UE 410 for network slice 401. AMF 431 interacts with UDM 434 to obtain UE data including a list of authorized network slices for UE 410. AMF 431 authorizes network slice 401 in response to the request by UE 410 and the presence of slice 401 on the authorized list. AMF 431 may use a Network Slice Selection Function (NSSF) to assist with slice authorization. AMF 431 interacts with PCF 435 to select QoS parameters for selected network slice 401. The QoS parameters should correspond to the slice characterizations in the broadcast SIB and to the user application requirements in UE 410. AMF 431 directs SMF 432 to instantiate selected network slice 401 per the QoS parameters. SMF 432 interacts with UDM 434 to select UPF 437 based on selected slice 401. SMF 432 configures UPF 437 to serve UE 410 per the QoS parameters and signals AMF 431 that UPF 437 is configured for UE 410. AMF 431 signals 5GNR gNodeB 421 to serve UE 421 over slice 401 per the QoS parameters. 5GNR gNodeB 421 signals UE 410 with network addresses and QoS parameters for selected network slice 401. 5GNR UE 410 and 5GNR gNodeB 421 wirelessly exchange user data responsive to the signaling. 5GNR gNodeB 421 and UPF 437 exchange the user data responsive to the signaling. UPF 437 exchanges the user data with external systems responsive to the signaling.

In another example, the UE capability messaging may indicate selected network slice 402. AMF 431 authorizes UE 410 for network slice 402. AMF 431 interacts with PCF 445 to select QoS parameters for selected network slice 402. The QoS parameters should correspond to the slice characterizations in the broadcast SIB and to the user application requirements in UE 410. AMF 431 directs SMF 442 to instantiate selected network slice 402 per the QoS parameters. SMF 442 interacts with UDM 444 to select UPF 447 based on selected slice 402. SMF 442 configures UPF 447 to serve UE 410 per the QoS parameters and signals AMF 431 that UPF 447 is configured for UE 410. AMF 431 signals 5GNR gNodeB 421 to serve UE 410 over slice 402 per the QoS parameters. 5GNR gNodeB 421 signals UE 410 with network addresses and QoS parameters for selected network slice 402. 5GNR UE 410 and 5GNR gNodeB 421 wirelessly exchange user data responsive to the signaling. 5GNR gNodeB 421 and UPF 447 exchange the user data responsive to the signaling. UPF 447 exchanges the user data with external systems responsive to the signaling.

Figure 8:
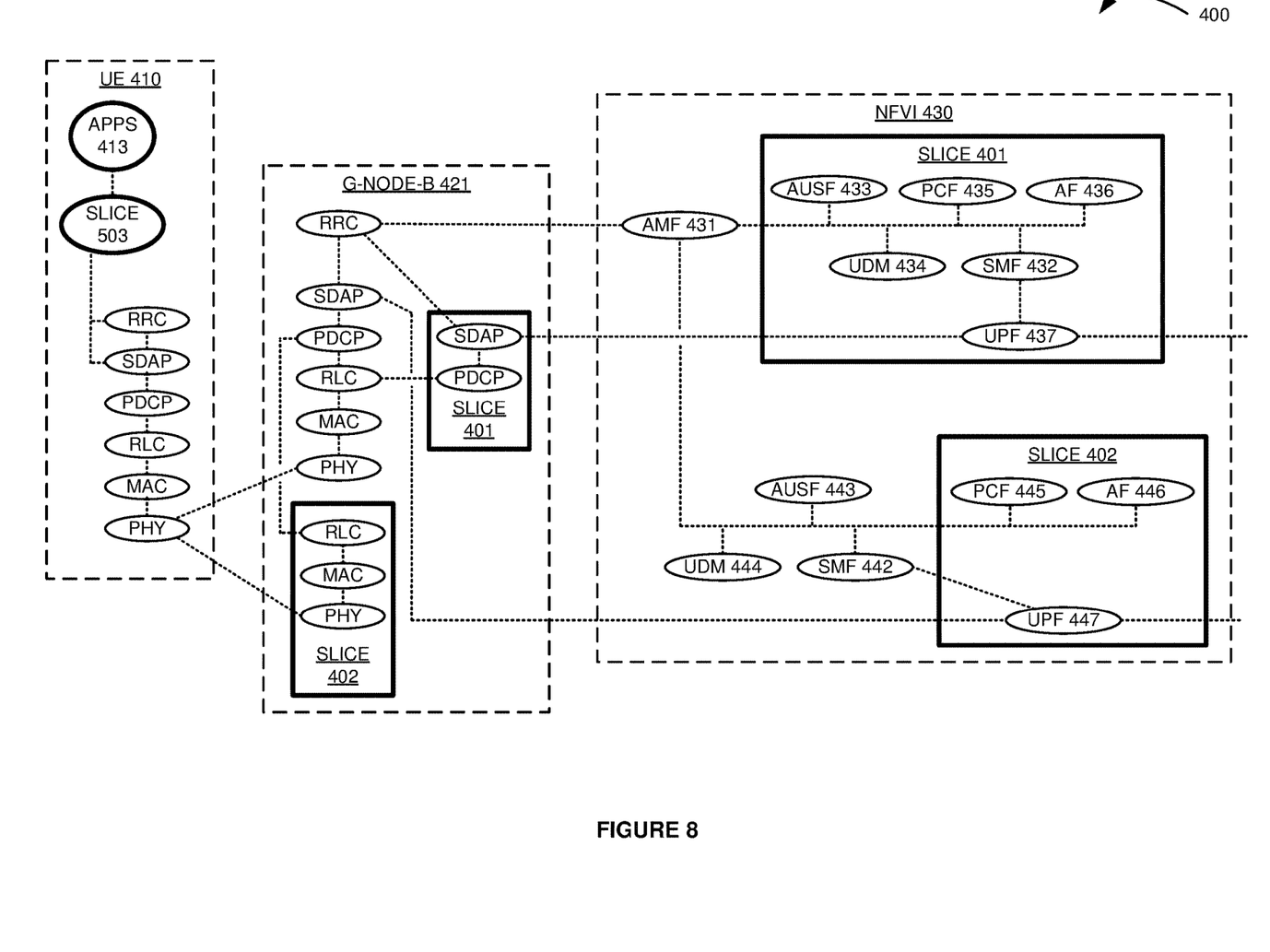
FIG. 8 illustrates the operation of the 5GNR UE, 5GNR gNodeB, and Network Function Virtualization Infrastructure (NFVI) to serve the 5GNR UE over wireless network slices that were selected by the 5GNR UE for its user applications.

FIG. 8 illustrates the operation of 5GNR UE 410, 5GNR gNodeB 421, and Network Function Virtualization Infrastructure (NFVI) 430 to serve 5GNR UE 410 over wireless network slices 401-402 that were selected by 5GNR UE 410 for user applications 413. The RRC in 5GNR UE 410 wirelessly attaches to the RRC in 5GNR gNodeB 421 over the frequency band and their SDAPs, PDCPs, RLCs, MACs, and PHYs that are not in slices 401-402. The RRC in 5GNR gNodeB 421 wirelessly broadcasts MIBs and SIBs over these PDCPs, RLCs, MACs, and PHYs that indicate wireless network slices 401-402 and their individual slice characteristics like data rate, data latency, error rate band, slice owner, slice cost, network ID, and/or some other slice information. The RRC in 5GNR UE 410 transfers the slice data to slice controller 503.

UE 410 executes user applications 413 like video-streaming, vehicle-control, augmented-reality, or some other user software. User applications 413 have user requirements like data rate, latency, error rate, owner, cost, network ID, and/or some other user requirements. Slice controller 503 identifies currently executing user applications 413 and identifies their user requirements. Slice controller 503 compares these current user requirements to the slice characteristics from 5GNR gNodeB 421 for correspondence. Slice controller 503 selects corresponding wireless network slices to serve 5GNR UE 410. In this example, slice controller 503 selects network slice 401 to serve user applications 413 based on the data latency of slice 401, the channel size for the frequency band, and the user requirements for low-latency over a large channel. The RRC in UE 410 generates a UE capability message that indicates selected wireless network slice 401. The RRC in UE 410 wirelessly transfers the UE capability message to the RRC in gNodeB 421 over the PDCPs, RLCs, MACs, and PHYs. The RRC in gNodeB 421 transfers the UE capability message to AMF 431 in NFVI 430.

In response to the UE capability message, AMF 431 attempts to use selected network slice 401. AMF 431 interacts with AUSF 433 which interacts with UDM 434 to authenticate and authorize UE 410 for network slice 401. AMF 431 interacts with UDM 434 to obtain UE data including a list of authorized network slices for UE 410. AMF 431 authorizes network slice 401 when slice 401 is on the authorization list from AUSF 433. AMF 431 may use a Network Slice Selection Function (NSSF) to assist with the slice authorization. AMF 431 interacts with PCF 435 to select Quality-of-Service (QoS) parameters for selected network slice 401—large amounts of bandwidth and low-latency. The QoS parameters should correspond to the slice characterization in the broadcast SIB and to the user requirements in UE 410. AMF 433 directs SMF 432 to instantiate selected network slice 401 per the QoS parameters. SMF 432 interacts with UDM 434 to select UPF 437 and network addressing based on selected slice 401. SMF 432 configures UPF 437 to serve UE 410 per the network addressing and the QoS. SMF 432 signals AMF 431 that UPF 437 is configured for UE 410. AMF 431 signals the RRC in 5GNR gNodeB 421 to serve UE 421 over slice 401 per the QoS parameters and network addressing. The RRC in 5GNR gNodeB 421 signals the RRC in UE 410 with network addresses and QoS parameters for selected network slice 401. The SDAP in 5GNR UE 410 and the SDAP in 5GNR gNodeB 421 wirelessly exchange user data using the QoS and network addressing responsive to the signaling. This data exchange uses the PDCP, RLC, MAC, and PHY in UE 410. In gNodeB 421, the data exchange uses the PHY, MAC and RLC that are not in slice 401 and also uses the PDCP and SDAP that are in slice 401. The SDAP that in slice 401 in gNodeB 421 exchanges the user data with UPF 437 using the network addressing and QoS. UPF 437 in slice 401 exchanges the user data with external systems per the QoS.

In another example, slice controller 503 may select network slice 402 to serve currently executing user applications 413 in response to an updated and lower cost to use slice 402 instead of slice 401. The RRC in UE 410 generates a UE capability message that indicates selected wireless network slice 402. The RRC in UE 410 wirelessly transfers the UE capability message to the RRC in gNodeB 421 over the PDCPs, RLCs, MACs, and PHYs. The RRC in gNodeB 421 transfers the UE capability message to AMF 431 in NFVI 430.

In response to the UE capability message, AMF 431 attempts to use selected network slice 402 for UE 410. AMF 431 interacts with AUSF 443 which interacts with UDM 444 to authenticate and authorize UE 410 for network slice 402. AMF 431 interacts with UDM 444 to obtain UE data including a list of authorized network slices for UE 410. AMF 431 authorizes network slice 402 when slice 402 is on the authorization list from AUSF 443. AMF 431 interacts with PCF 445 to select QoS parameters for selected network slice 402—large amounts of bandwidth and low-latency at a lower cost. The QoS parameters should correspond to the slice characterization in the broadcast SIB and to the user requirements in UE 410. AMF 431 directs SMF 442 to instantiate selected network slice 402 per the QoS parameters. SMF 442 interacts with UDM 444 to select UPF 447 and network addressing based on selected slice 402. SMF 442 configures UPF 447 to serve UE 410 per the network addressing and the QoS. SMF 442 signals AMF 431 that UPF 447 is configured for UE 410. AMF 431 signals the RRC in 5GNR gNodeB 421 to serve UE 410 over slice 402 per the QoS parameters and network addressing. The RRC in 5GNR gNodeB 421 signals the RRC in UE 410 with network addresses and QoS parameters for selected network slice 402. The SDAP in 5GNR UE 410 and the SDAP in 5GNR gNodeB 421 wirelessly exchange user data using the QoS and network addressing responsive to the signaling. This data exchange uses the PDCP, RLC, MAC, and PHY in UE 410. In gNodeB 421, the data exchange uses the PHY, MAC and RLC in slice 402 and also uses the PDCP and SDAP that are not in slices 401-402. The SDAP in gNodeB 421 exchanges the user data with UPF 447 using the network addressing and QoS. UPF 447 in slice 401 exchanges the user data with external systems per the QoS.

Advantageously, 5GNR UE 410 efficiently and effectively controls wireless network slices 401-402 to serve its specific user requirements.

The wireless data network circuitry described above comprises computer hardware and software that form special-purpose user circuitry to select network slices based on user requirements and slice characteristics. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose user circuitry to select network slices based on user requirements and slice characteristics.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network that comprises wireless network slices to serve a wireless User Equipment (UE) that executes a user application that has user requirements, the method comprising:

a wireless access node wirelessly broadcasting System Information Blocks (SIBs) that indicate individual slice characteristics for the wireless network slices, wirelessly receiving UE capability information from the wireless UE that indicates a selected one of the wireless network slices, and transferring the UE capability information to an Access and Mobility Management Function (AMF), wherein the wireless UE wirelessly receives the SIBs, selects the selected one of the wireless network slices based on the user requirements for the user application and the individual slice characteristics for the wireless network slices, and indicates the selected one of the wireless network slices in the UE capability information;

the AMF receiving the UE capability information from the wireless access node that indicates the selected one of the wireless network slices for the wireless UE, authorizing the wireless UE for the selected one of the wireless network slices, selecting Quality-of-Service (QoS) parameters for the wireless UE that correspond to the individual slice characteristics for the selected one of the wireless network slices, and transferring signaling to the wireless access node to serve the wireless UE per the selected QoS parameters; and the wireless access node receiving the signaling from the AMF, and in response, wirelessly exchanging user data with the wireless UE per the selected QoS parameters.

2. The method of claim 1 wherein the user requirements for the user application and the individual slice characteristics for the selected one of the wireless network slices comprise data rates.

3. The method of claim 1 wherein the user requirements for the user application and the individual slice characteristics for the selected one of the wireless network slices comprise data latencies.

4. The method of claim 1 wherein the user requirements for the user application and the individual slice characteristics for the selected one of the wireless network slices comprise error rates.

5. The method of claim 1 wherein the user requirements for the user application and the individual slice characteristics for the selected one of the wireless network slices comprise radio bands.

6. The method of claim 1 wherein the user requirements for the user application and the individual slice characteristics for the selected one of the wireless network slices comprise network identifiers.

7. The method of claim 1 wherein the user requirements for the user application and the individual slice characteristics for the selected one of the wireless network slices comprise Public Land Mobile Network (PLMN) identifiers.

8. The method of claim 1 wherein the user requirements for the user application and the individual slice characteristics for the selected one of the wireless network slices comprise slice costs.

9. The method of claim 1 wherein the user requirements for the user application and the individual slice characteristics for the selected one of the wireless network slices comprise slice owners.

10. The method of claim 1 wherein the user requirements for the user application and the individual slice characteristics for the selected one of the wireless network slices comprise at least one of massive Machine Type Communications (eMTC) information, Ultra Reliable Low Latency Communications (URLLC) information, and enhanced Mobile Broadband (eMBB) information.

11. A wireless communication network that comprises wireless network slices to serve a wireless User Equipment (UE) that executes a user application that has user requirements, the wireless communication network comprising:

a wireless access node configured to wirelessly broadcast System Information Blocks (SIBs) that indicate individual slice characteristics for the wireless network slices, wirelessly receive UE capability information from the wireless UE that indicates a selected one of the wireless network slices, and transfer the UE capability information to an Access and Mobility Management Function (AMF), wherein the wireless UE is configured to wirelessly receive the SIBs, select the selected one of the wireless network slices based on the user requirements for the user application and the individual slice characteristics for the wireless network slices, and indicate the selected one of the wireless network slices in the UE capability information;

the AMF configured to receive the UE capability information from the wireless access node that indicates the selected one of the wireless network slices for the wireless UE, authorize the wireless UE for the selected one of the wireless network slices, select Quality-of-Service (QoS) parameters for the wireless UE that correspond to the individual slice characteristics for the selected one of the wireless network slices, and transfer signaling to the wireless access node to serve the wireless UE per the selected QoS parameters; and the wireless access node configured to receive the signaling from the AMF, and in response, wirelessly exchange user data with the wireless UE per the selected QoS parameters.

12. The wireless communication network of claim 11 wherein the user requirements for the user application and the individual slice characteristics for the selected one of the wireless network slices comprise data rates.

13. The wireless communication network of claim 11 wherein the user requirements for the user application and the individual slice characteristics for the selected one of the wireless network slices comprise data latencies.

14. The wireless communication network of claim 11 wherein the user requirements for the user application and the individual slice characteristics for the selected one of the wireless network slices comprise error rates.

15. The wireless communication network of claim 11 wherein the user requirements for the user application and the individual slice characteristics for the selected one of the wireless network slices comprise radio bands.

16. The wireless communication network of claim 11 wherein the user requirements for the user application and the individual slice characteristics for the selected one of the wireless network slices comprise network identifiers.

17. The wireless communication network of claim 11 wherein the user requirements for the user application and the individual slice characteristics for the selected one of the wireless network slices comprise Public Land Mobile Network (PLMN) identifiers.

18. The wireless communication network of claim 11 wherein the user requirements for the user application and the individual slice characteristics for the selected one of the wireless network slices comprise slice costs.

19. The wireless communication network of claim 11 wherein the user requirements for the user application and the individual slice characteristics for the selected one of the wireless network slices comprise slice owners.

20. The wireless communication network of claim 11 wherein the user requirements for the user application and the individual slice characteristics for the selected one of the wireless network slices comprise at least one of massive Machine Type Communications (eMTC) information, Ultra Reliable Low Latency Communications (URLLC) information, and enhanced Mobile Broadband (eMBB) information.

* * * * *